(12) United States Patent
Moor

(10) Patent No.: US 7,847,208 B2
(45) Date of Patent: Dec. 7, 2010

(54) METHODS FOR PERFORMING MANUAL LASER DEPOSITION

(75) Inventor: James J. Moor, Torrington, CT (US)

(73) Assignee: United Technologies Corporation, Hartford, CT (US)

(*) Notice: Subject to any disclaimer, the term of this patent is extended or adjusted under 35 U.S.C. 154(b) by 466 days.

(21) Appl. No.: 11/782,781

(22) Filed: Jul. 25, 2007

(65) Prior Publication Data

US 2009/0026174 A1 Jan. 29, 2009

(51) Int. Cl.
*B23K 9/04* (2006.01)
*B23K 26/00* (2006.01)

(52) U.S. Cl. ............... 219/76.1; 219/121.6; 219/121.61; 219/121.78

(58) Field of Classification Search ................. 219/76.1, 219/121.6, 121.61, 121.78
See application file for complete search history.

(56) References Cited

U.S. PATENT DOCUMENTS

| | | | |
|---|---|---|---|
| 4,564,736 A | | 1/1986 | Jones et al. |
| 4,665,294 A | | 5/1987 | Hira et al. |
| 5,421,998 A | * | 6/1995 | Li et al. ............... 210/136 |
| 6,333,484 B1 | | 12/2001 | Foster et al. |
| 6,342,688 B1 | | 1/2002 | Israel |
| 6,495,793 B2 | | 12/2002 | Tewari |
| 6,884,964 B2 | | 4/2005 | Murphy |
| 7,038,162 B2 | | 5/2006 | Baker et al. |
| 7,094,988 B1 | | 8/2006 | Taylor |
| 7,146,725 B2 | | 12/2006 | Kottilingam et al. |
| 2003/0094259 A1 | | 5/2003 | Siedal |
| 2004/0172826 A1 | | 9/2004 | Memmen et al. |
| 2005/0205415 A1 | | 9/2005 | Belousov et al. |
| 2005/0214110 A1 | | 9/2005 | Sakurai et al. |
| 2005/0249888 A1 | | 11/2005 | Makhotkin et al. |

FOREIGN PATENT DOCUMENTS

| | | | |
|---|---|---|---|
| EP | 0558870 | | 9/1993 |
| EP | 558870 A1 | * | 9/1993 |
| EP | 1959095 | | 8/2008 |
| JP | 62183987 | | 8/1987 |
| JP | 11347774 | | 12/1999 |
| JP | 11347774 A | * | 12/1999 |
| JP | 2005254317 | | 9/2005 |
| JP | 2005254317 A | * | 9/2005 |

OTHER PUBLICATIONS

European Search Report dated Nov. 17, 2008.

* cited by examiner

*Primary Examiner*—Tu B Hoang
*Assistant Examiner*—Ayub Maye
(74) *Attorney, Agent, or Firm*—Carlson, Gaskey & Olds PC

(57) ABSTRACT

Methods for performing manual laser deposition are provided. In this regard, a representative method includes: directing a laser beam at a first deposit location of a substrate to re-melt: at least a portion of a first deposit of weld filler, at least a portion of a second deposit of weld filler located at a second deposit location that partially overlaps the first deposit, and at least a portion of the substrate.

19 Claims, 3 Drawing Sheets

DEPOSITION

INTERLAYER DRY PASS

METHODS FOR PERFORMING MANUAL LASER DEPOSITION

BACKGROUND

1. Technical Field

The disclosure generally relates to welding.

2. Description of the Related Art

Automated laser deposition techniques can enable repeatable, near zero defect deposition of material. However, such automated processes tend to be inflexible, in that such processes can be difficult and/or tedious to adapt to welding of components of various shapes, sizes and/or arrangements. Although quite flexible in its adaptability, manual laser deposition tends to suffer from increased defects.

SUMMARY

Methods for performing manual laser deposition are provided. In this regard, an exemplary embodiment of a method comprises: directing a laser beam at a first deposit location of a substrate to re-melt: at least a portion of a first deposit of weld filler, at least a portion of a second deposit of weld filler located at a second deposit location that partially overlaps the first deposit, and at least a portion of the substrate.

Another exemplary embodiment of a method comprises: positioning weld filler in proximity to a substrate; directing a laser beam toward the weld filler such that a first portion of the weld filler melts and forms a first deposit on a substrate in a first deposit location; repositioning the weld filler such that the weld filler is located adjacent to the first deposit location; subsequently directing the laser beam toward the weld filler located adjacent to the first deposit location such that a second portion of the weld filler melts and forms a second deposit on the substrate in a second deposit location, the second deposit overlying at least a portion of the first deposit; and directing the laser beam at the first location such that at least a portion of the first deposit, at least a portion of the second deposit, and at least a portion of the substrate are melted without depositing additional weld filler.

Another exemplary embodiment of a method comprises: sequentially depositing at least partially overlapping deposits of weld filler on a substrate using a pulsed laser beam of a manually controlled laser, the pulsed laser beam providing a total heat input of between approximately 20% and approximately 30% of the minimum heat required to melt the weld filler and the substrate during the depositing; and re-melting, with the pulsed laser beam, in an overlapping fashion.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

As will be described in detail here, methods for performing manual laser deposition are provided. In this regard, some embodiments can provide near zero defect results despite using a manual laser, i.e., a laser that is manually controlled by an operator. Notably, an exemplary embodiment involves increasing an amount of overlap between areas that are sequentially melted by the laser in order to improve heat penetration through the deposited material and into the substrate. The use of high-density overlap enables a low energy, yet highly focused, laser to deposit material on substrates, including thin-walled substrates that may otherwise be subject to warping during other heating techniques. As used herein, thin-walled refers to a substrate of approximately 0.039 inches (1 mm) in thickness or less.

Figure 1:
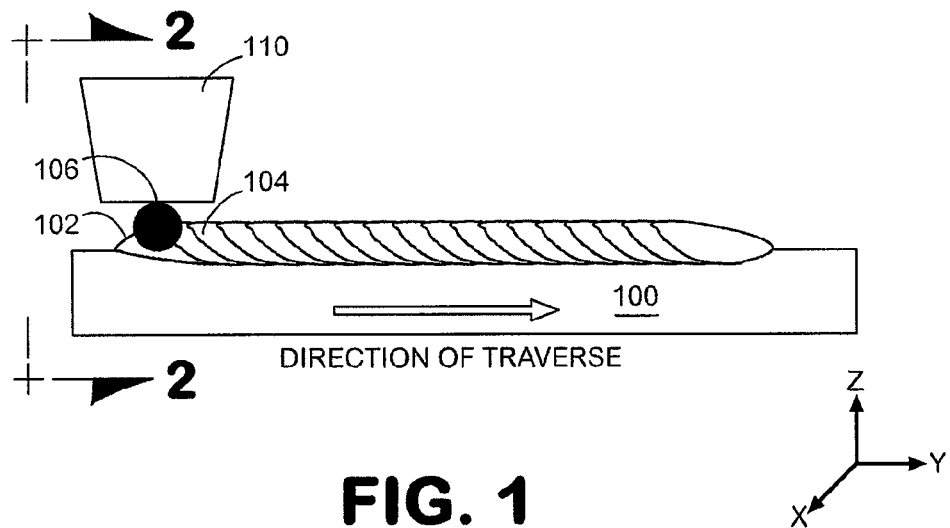
FIG. 1 is a schematic side view depicting a laser performing manual laser deposition in accordance with an embodiment.

FIG. 1 is a schematic side view depicting a laser performing manual laser deposition in accordance with an embodiment of a method. As shown in FIG. 1, a substrate 100 is provided upon which is deposited sequential overlapping pulse deposits (e.g., deposits 102, 104) of weld filler. In this figure, an approximate 75% pulse overlap is controlled by parameter selection. By way of example, the substrate can be formed of 321 Stainless Steel and the weld filler can be formed of 347 Stainless Steel. In this embodiment, the substrate is a thin-walled substrate that forms a portion of a tube and the weld filler is provided by a wire 106 exhibiting a diameter of approximately 0.020 inches (0.508 mm). Because the substrate is thin walled, the potential for blow though of the substrate is accommodated by parameter selection.

In order to perform deposition of the weld filler, the wire is placed adjacent to the substrate and a laser 110 is aligned with the weld filler so that a laser beam emitted by the laser illuminates the weld filler. Although the melting area provided by the laser beam need only correspond to the diameter of the weld filler, to further decrease the incidence of defects, the largest possible beam diameter can be selected to provide the greatest amount of operator margin.

In order to melt the weld filler, power of the laser is adjusted in order to melt the wire and corresponding adjacent portion of the substrate in order to provide for adequate fusion of the weld filler to the substrate. By way of example, the total heat input provided by the laser beam can be between approximately 20% and approximately 30%, preferably between approximately 23% and approximately 27% of the minimum heat required to fully melt the weld filler and substrate. In practice, such a power setting can be determined by destructive and/or non-destructive evaluation of a test sample.

Figure 2:
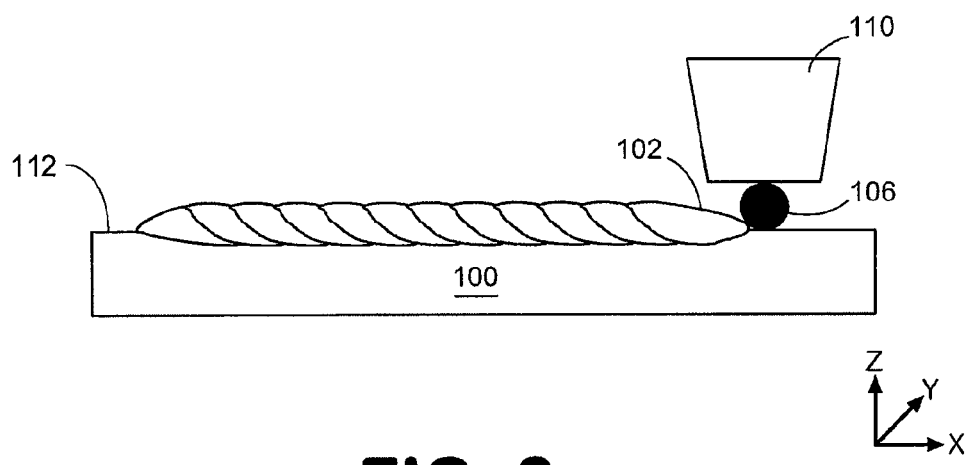
FIG. 2 is a schematic side view of the embodiment of FIG. 1, as viewed parallel to the direction of traverse of the laser.

Positioning of the weld filler with respect to a previously deposited row of material deposits is shown schematically in FIG. 2. In particular, FIG. 2 depicts substrate 100 and the deposited material of FIG. 1 as viewed in a plane perpendicular to the direction of traverse of the laser during deposition. Note that the weld filler wire is positioned at an intersection of the adjacent deposit 102 and an upper surface 112 of the substrate. In some embodiments, such positioning can result in the deposited weld filler overlapping the adjacent deposit by approximately 40%.

In the embodiment of FIGS. 1 and 2, the laser 110 is a pulsed laser that is manually positioned. In this regard, some embodiments involve the use of a component fixture (not shown) that is used to hold and position the substrate for deposition. It should be noted that the weld surface should be maintained as perpendicular as possible to the laser in order to reduce the amount of z height adjustment during welding.

Once suitably positioned, an operator traverses the substrate with appropriately positioned weld filler and with pulsed illumination areas of the laser typically at a fixed rate of traversal. In this regard, a pulse rate of between approximately 1 and approximately 6 cycles per millimeter, preferably between approximately 2 and approximately 4 cycles per millimeter can be used. Notably at 3 cycles per millimeter, a 4 hertz pulse rate results in approximately 80 millimeters of deposition per minute, whereas a 5 hertz pulse rate results in approximately 100 millimeters of deposition per minute.

Figure 3:
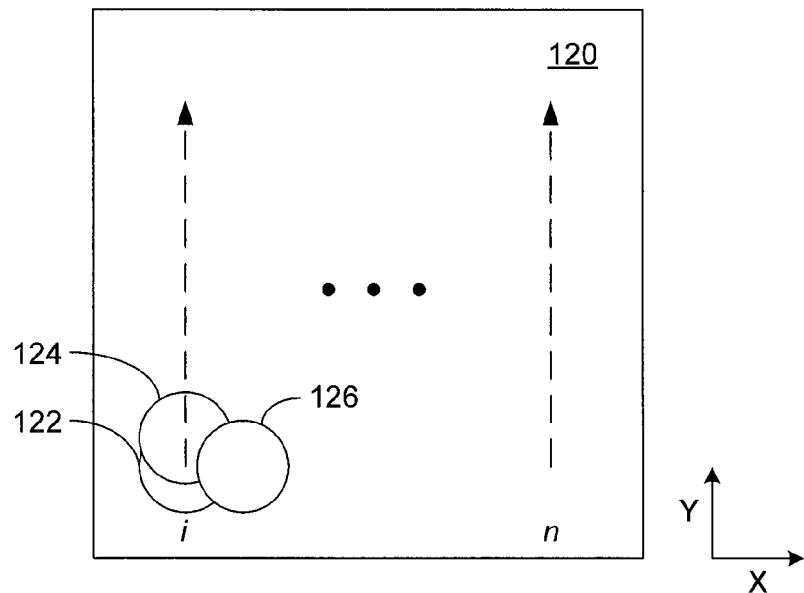
FIG. 3 is a schematic plan view depicting sequential melting areas by a laser performing material deposition in accordance with another embodiment.

FIG. 3 schematically depicts an embodiment of a deposition process that involves melt areas defined by sequential pulses of a laser being applied to a substrate 120 in parallel rows. Specifically, row i includes a sequential application of pulses. In this case, a first area 122 is illuminated followed by a second area 124, and so on. Sequential rows are then illuminated up through the $n^{th}$ row. Notably, an overlap as depicted in FIG. 2 of approximately 40% is used between rows, e.g., area 126 of the row (i+1) overlaps approximately 40% of an area in row i. Note also that bi-directional deposition can occur in some embodiments in contrast to the unidirectional deposition depicted in FIG. 3.

Figure 4:
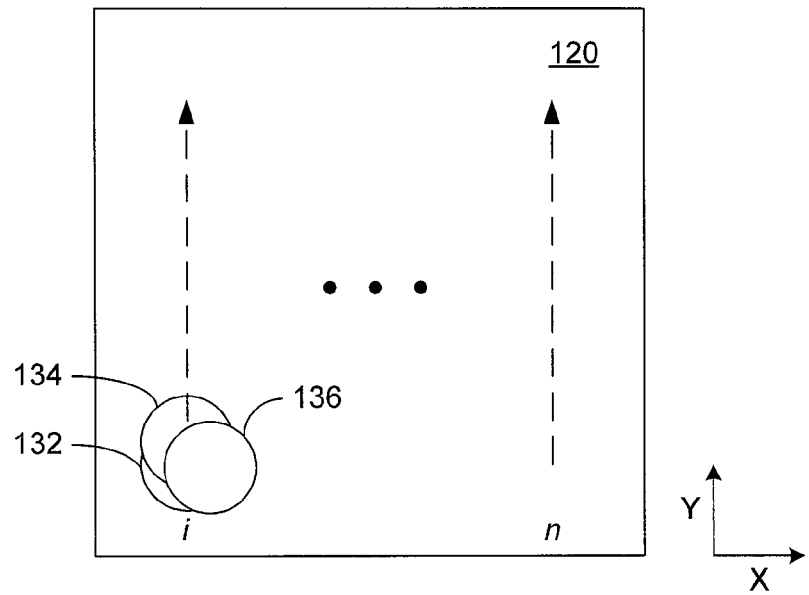
FIG. 4 is a schematic plan view of a substrate and representative sequential melting areas by a laser performing an interlayer dry pass in accordance with another embodiment.

In order to ensure adequate fusion of the weld filler and substrate, an interlayer dry pass is used. In this regard, an embodiment of an interlayer dry pass is depicted schematically in FIG. 4. As shown in FIG. 4, the interlayer dry pass is placed in the same direction as the initial deposition. Note, however, that in other embodiments, other directions of traverse, e.g., perpendicular to the deposition direction, can be used.

In this embodiment, the sequential overlapping melt areas form parallel rows as in FIG. 3. In this case, a first melt area 132 is melted followed by a second melt area 134, and so on. However, in contrast to applying the deposition rows, an overlap of between approximately 70% and approximately 80%, preferably between approximately 73% and 77%, and most preferably approximately 75% of the diameter of a melt area exists between adjacent rows. For instance, in FIG. 4, area 136 of the row (i+1) overlaps approximately 75% of an area in row i. Note also that bi-directional illumination can occur in some embodiments in contrast to the unidirectional illumination depicted in FIG. 4. In some embodiments, more than one interlayer dry pass can be performed.

Figure 5:
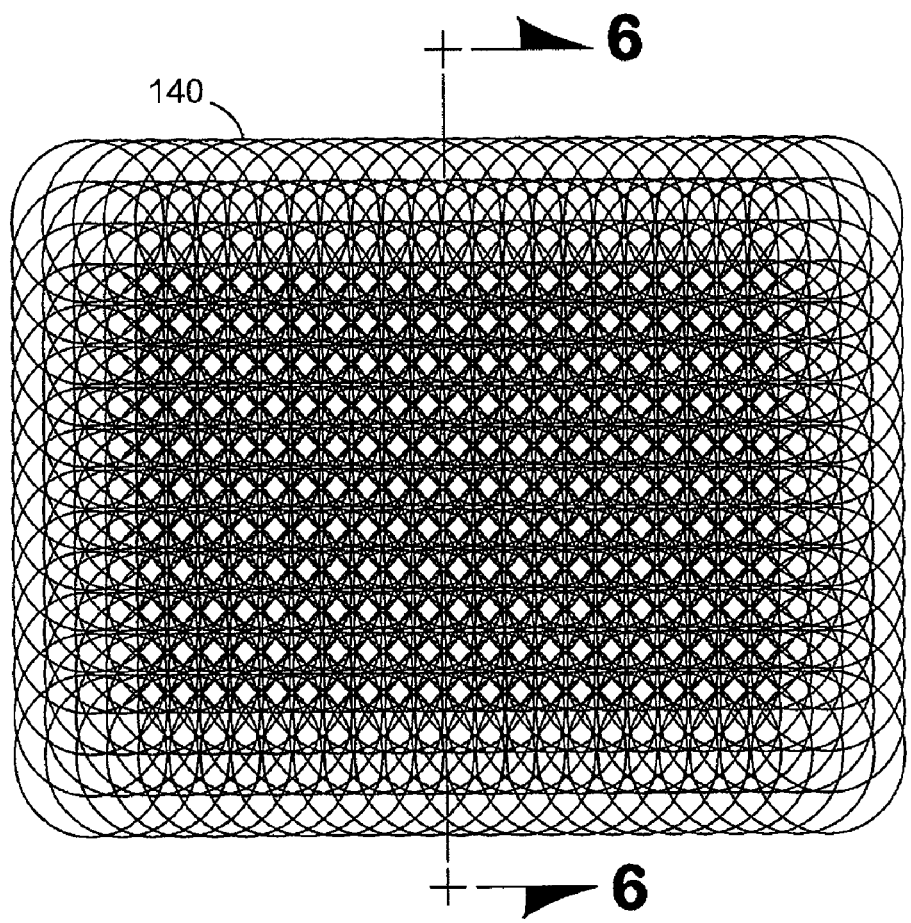
FIG. 5 is a schematic plan view of representative sequential melting areas by a laser performing an interlayer dry pass in accordance with another embodiment.
Figure 6:
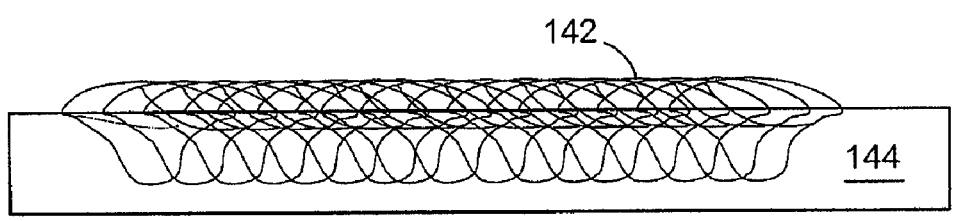
FIG. 6 is a schematic side view of the embodiment of FIG. 5 showing material deposition and extent of melt penetration into the substrate.

FIG. 5 is a schematic plan view depicting exemplary melt areas (e.g., area 140) formed by an interlayer dry pass with the resulting welding filler and substrate fusion being depicted schematically in FIG. 6, which is illustrated perpendicular to the direction of traverse. As shown in FIG. 6, the heat input provided by the laser during the interlayer dry pass re-melts the deposited weld filler 142 and the underlying substrate 144, thereby providing near zero defect fusion of the materials.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A method for performing manual laser deposition comprising:
    positioning weld filler in proximity to a substrate;
    directing a laser beam toward the weld filler such that a first portion of the weld filler melts and forms a first deposit on a substrate in a first deposit location;
    repositioning the weld filler such that the weld filler is located adjacent to the first deposit location;
    subsequently directing the laser beam toward the weld filler located adjacent to the first deposit location such that a second portion of the weld filler melts and forms a second deposit on the substrate in a second deposit location laterally to the first deposit location, the second deposit overlying at least a portion of the first deposit but not the entire first deposit; and
    directing the laser beam at the first location such that at least a portion of the first deposit, at least a portion of the second deposit, and at least a portion of the substrate are melted without depositing additional weld filler.

2. The method of claim 1, wherein:
    the weld filler is provided by a weld filler wire; and
    the repositioning comprises locating the weld filler wire at an intersection of the first deposit and the substrate for forming the second deposit.

3. The method of claim 1, further comprising directing the laser beam to perform a dry pass such that at least a portion of the first deposit, at least a portion of the second deposit and at least a portion of the substrate are melted.

4. The method of claim 3, wherein, in directing the laser beam to perform the dry pass, each sequentially applied melt area overlaps an immediately preceding melt area by at least 70% of the diameter of the immediately preceding melt area.

5. The method of claim 4, wherein, in directing the laser beam to perform the dry pass, each sequentially applied melt area overlaps an immediately preceding melt area by no more than 80% of the diameter of the immediately preceding melt area.

6. The method of claim 1, wherein the laser beam exhibits a fixed traverse with a pulse rate of approximately 3 cycles per millimeter.

7. The method of claim 1, wherein the substrate exhibits a thickness of no greater than approximately 0.039 inches (1 mm) at the first deposit location prior to forming the first deposit.

8. The method of claim 1, wherein the first deposit is formed by:
    directing a pulsed laser beam toward a weld filler wire such that a portion of the weld filler wire melts and is deposited on the substrate as the first deposit; and
    the pulsed laser beam providing a total heat input of at least approximately 20% of the minimum heat required to melt the weld filler wire and the substrate during depositing of the first deposit.

9. The method of claim 8, wherein the total heat input is between approximately 20% and approximately 30% of the minimum heat required to melt the weld filler wire and the substrate during depositing of the first deposit.

10. The method of claim 8, wherein the total heat input is between approximately 23% and approximately 27% of the minimum heat required to melt the weld filler wire and the substrate.

11. The method of claim 1, wherein the method further comprises performing a dry pass to re-melt at least a portion of the first deposit, at least a portion of the second deposit and at least a portion of the substrate, with each sequentially applied melt area overlapping an immediately preceding melt area by at least 70% of the diameter of the immediately preceding melt area.

12. The method of claim 10, wherein each sequentially applied melt area overlaps an immediately preceding melt area by between approximately 73% and approximately 77% of the diameter of the immediately preceding melt area.

13. The method of claim 1, wherein the substrate is a thin-walled substrate.

14. The method of claim 1, wherein:
the weld filler is deposited in sequential rows of deposits; and
the re-melting is performed by sequential rows of overlapping melting areas of the pulsed laser beam.

15. The method of claim 14, wherein adjacent ones of the overlapping melting areas formed during the re-melting overlap by between approximately 70% and approximately 80% of the diameter of one of the melting areas.

16. The method of claim 1, wherein:
the substrate is formed of 321 Stainless Steel; and
the weld filler is formed of 347 Stainless Steel.

17. The method of claim 1, wherein the substrate is tubular.

18. The method of claim 17, wherein the substrate has a maximum wall thickness of between approximately 1 millimeter at a location at which the weld filler is deposited prior to the depositing.

19. The method of claim 1, wherein the pulsed laser beam exhibits a pulse rate of between approximately 1 cycle and approximately 6 cycles per millimeter.

* * * * *